March 15, 1955　　　R. BARNARD　　　2,704,215
SPRING SUSPENSION FOR TANDEM AXLE VEHICLES
Filed Nov. 6, 1952　　　　　　　　　3 Sheets-Sheet 1

INVENTOR.
RALPH BARNARD
BY John H. Ruckman
Attorney

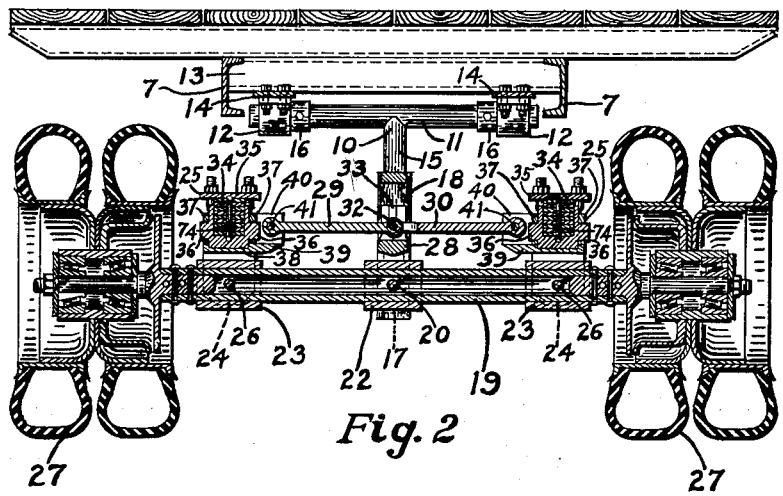

March 15, 1955  R. BARNARD  2,704,215
SPRING SUSPENSION FOR TANDEM AXLE VEHICLES
Filed Nov. 6, 1952  3 Sheets-Sheet 3
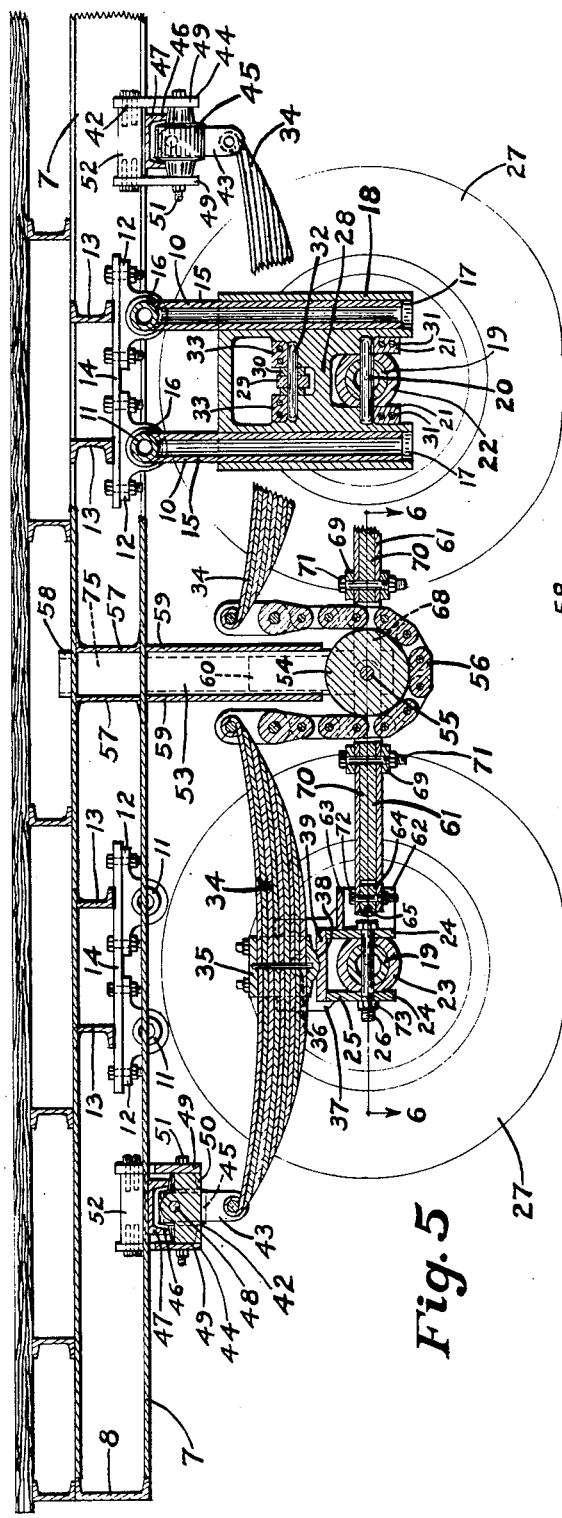
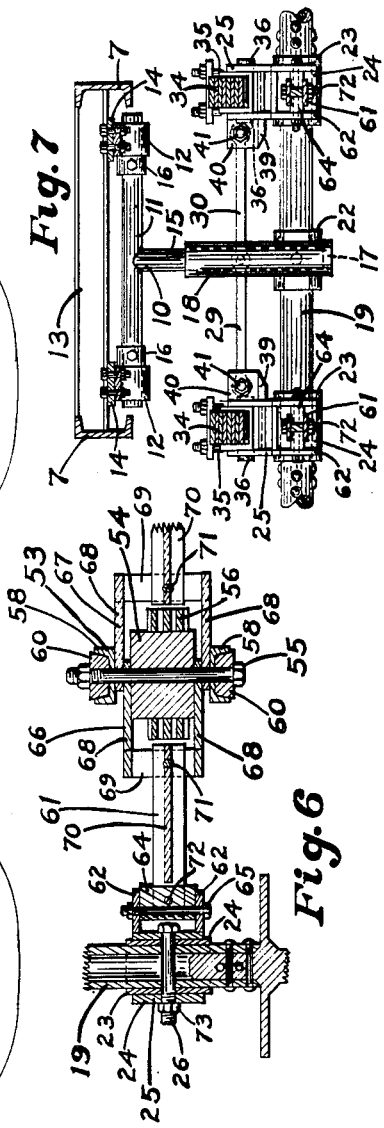
INVENTOR.
RALPH BARNARD
BY John H. Ruckman
Attorney

United States Patent Office 2,704,215
Patented Mar. 15, 1955

2,704,215

SPRING SUSPENSION FOR TANDEM AXLE VEHICLES

Ralph Barnard, New Orleans, La.

Application November 6, 1952, Serial No. 319,093

4 Claims. (Cl. 280—104.5)

My invention relates to tandem axle vehicles.

The object of this invention is to mount semi-elliptic leaf springs on the axles of a vehicle with a gimbal type mounting so that the springs will not be twisted or lean over sideways when one axle of a set of tandem axles oscillates.

Another object of this invention is to fasten the axles to the vehicle in such a way that the equalizing mechanism will not be affected by wheel torque or brake torque.

Another object is to provide a means for keeping the semi-elliptic leaf springs in a plane perpendicular to the floor of the vehicle at all times while the axles rise, fall, or oscillate.

Still another object of this invention is to provide shackles for the ends of the springs which will permit the average of the stresses caused by the forces supporting the load to pass through the center of the semi-elliptic springs while the axles are oscillating and causing the springs to move sideways.

To the above ends my invention consists of a running gear with tandem axles in equalized suspension which has semi-elliptic leaf springs mounted on opposite ends of each axle in such a way that the vehicle will operate smoothly at high speeds when traveling over smooth tracks or roadways, and can also travel over the roughest type of tracks or roadways without twisting the leaf springs or causing them to break because of side thrust.

One form of the invention is illustrated in the accompanying drawings in which:

Figure 2 is a vertical cross section on line 2—2 of Fig. 1 showing a "T-guide structure" which holds the axle under the center of the vehicle and which holds the springs in a vertically disposed position.

Figure 3 is a vertical section on line 3—3 of Fig. 1 showing the shackles which travel sideways with ends of the springs when the axles oscillate and cause the springs to move sideways.

Figure 4 is a vertical cross section taken on the same line as Fig. 2 showing the relation of the parts when the axle is at its maximum angle of tilt, or has reached its extreme limit of oscillation.

Figure 5 is a vertical section on line 5—5 of Fig. 1 showing the typical method of fastening the T-guide structure to the axle and to the connecting link arms for one axle, and showing a typical section through the center line of the spring and spring mounting for the other axle.

Figure 6 is a cross section in plan on line 6—6 of Fig. 5 showing the method of fastening the ends of the radius rod with universal, or gimbal type connections.

Figure 7 is a vertical cross section on line 7—7 of Fig. 1 showing the ends of the radius rods connected to the gimbal type spring mounting.

Figure 1:
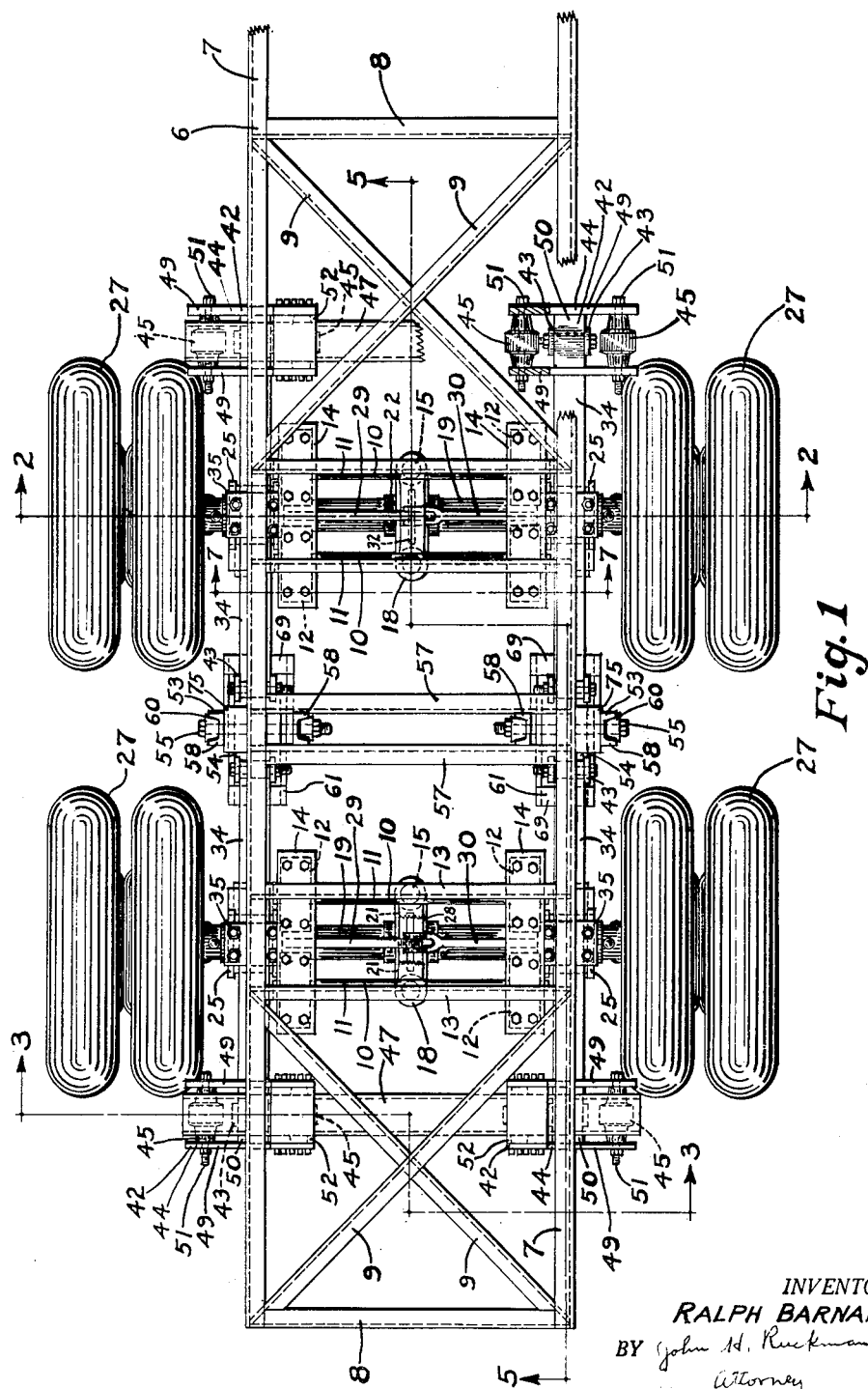
Figure 1 is a plan view of a typical vehicle in equalized suspension on tandem axles.

Referring to the drawings, I have shown a running gear for a vehicle with tandem axles supporting one end of the vehicle mounted on a conventional frame 6. The frame 6 is made in the customary manner by connecting two side members 7 with conventional cross members 8 and diagonal braces 9 as shown in Fig. 1.

The method which I am using to keep the center of the axles positioned under the center of the vehicle at all times is the T-guide structure 10. The T-guide structure 10 is best made by welding together two pieces of pipe or tubing in the form of a T. The cross arm 11 acts as a shaft and is journaled in bearings 12 at opposite ends of the cross arm 11.

I have located a cross beam 13 over each T-guide structure 10 with the ends of the cross beam 13 welded or fastened in any suitable manner, to the side members 7. Horizontal plates 14 are welded, or fastened, under the cross beams 13 to serve as a bearing seat for the bearings 12. The bearings 12 are bolted to the plates 14 as illustrated in Fig. 2, Fig. 5, and Fig. 7 thereby suspending the T-guide structures 10 under the vehicle. The vertical leg 15 of the T-guide structure 10 is maintained at all times under the exact center of the vehicle by bolting, or fastening, collars 16 around the cross arm 11 so that the sides of the collars 16 will act as thrust bearings against the sides of the bearings 12 and resist any lateral movement which the side thrust from the wheels tends to cause.

The vertical legs 15 slide up and down in the hollow cylinders 17 of the double-barrel guide sleeve 18 shown in Fig. 5. The axles 19 are fastened to the double-barrel guide sleeve 18 by means of a short heavy pin 20 which is journaled in slots which are milled in a pair of bosses located between the hollow cylinders 17.

I made the axles 19 by using a piece of tubing which is conventional for several types of vehicles. As shown in Fig. 2, I pressed a heavy ring 22 to the center of the piece of tubing and then pressed heavy rings 23 over the ends of the piece of tubing and then I either weld or braze the ends of the rings to the outside surface of the tubing so that they will be permanently and securely united. I then finished off facets on the front and back of ring 22 and rings 23 to give a bearing surface for the inside faces of the lower fork on the double-barrel guide sleeve 18 and the inside faces of the legs 24 under the gimbal type spring mounting 25. I have made the width between the facets on ring 22 and rings 23 the same so that the facets can be cut on all three rings in one operation in the machine shop. I then drilled and reamed a hole through the centers of the facets on the ring 22 and through the piece of tubing so that the short heavy pin 20 can be pressed into the hole, forming the center of the axle 19. Equally spaced on either side of the pin 20, I then drilled and reamed holes through the facets of the rings 23 so that conventional finished bolts 26 can be pressed into the holes later  The heavy rings 22 and 23 are added to the conventional axle 19 so that the axle will be reinforced and strengthened where the tubing was weakened by drilling holes for the pin 20 and the bolts 26. The rings 22 and 23 also increase the strength of the assembly by providing a greater bearing area for the sides of the pin 20 and under the bolts 26.

In this manner, I have made a beam type axle 19 with conventional wheels 27 mounted on both ends of the beam type axle by any conventional method and the novel type of equalized suspension is mounted on this axle by means of the short heavy pin 20 and the bolts 26.

The blank for making the double-barrel guide sleeve 18 can be made by any conventional method such as forging, casting, or welding together an assembly of separate pieces. The two legs on each side of the blank are bored out to form the hollow cylinders 17 and then the bosses between the hollow cylinders 17 are finished so that the legs of the double-barrel guide sleeve 18 will fit over the finished facets on the ring 22 with a "running fit" and a notch is cut in the top of the heavy middle cross member 28 so that an eye of connecting link arm 29 and the perforated fork of the connecting link arm 30 will fit into the notch with a "running fit." The slots in the bosses are then milled out so that the double-barrel guide sleeve 18 will drop down over the pin 20 while the pin is inserted in the hole in the center of the axle 19, and the ends of the slots are finished out so that the ends of the pins 20 will journal in the slots like the base portion of a bearing. The other half of this bearing, which corresponds to the bearing cover, is made from the small rectangular block 21 which slides into a slot, which has one edge finished with a concave, or cylindrical, groove along the edge which journals on the bottom half of the ends of the pin 20. The rectangular blocks are secured in the slots by bolts or dowels 31.

A pin 32 shown in Fig. 5 is secured to the double-barrel guide sleeve 18 by milling slots for a block 33 on each side of the notch above the middle cross member 28 so that the pin 32 will slide into the slots sideways while the pin 32 is inserted through the holes in the eye and fork of link 29 and link 30. The ends of the pin 32 are journaled in the bottom of the slots and held in place by the rectangular block 33 with a concave edge, using the same method which was used for the short heavy pin 20.

The gimbal type spring mounting or pivotal connection 25 is assembled by starting with a conventional half-elliptic spring pack 34 which is held together by a special clamp 35 located in the center of the spring pack 34 and held in center by a conventional centering pin as shown on Fig. 2 and Fig. 5. The clamp 35 has trunnion studs 36 located on opposite sides and journaled in bearings which are formed in the side plates 37. The trunnion studs 36 journaled in the side plates 37 do not give enough bearing surface to support the heavy loads contemplated, so I finished off the bottom of the clamp 35 with a convex surface 38 which is concentric with the trunnion studs 36; therefore the convex surface 38 will journal in the concave cylindrical groove formed in the surface of the plate 39 while the trunnion studs 36 are journaled in the side plates 37 and the convex surface 38 will bear a major portion of the load which is transmitted from the axle 19 to the springs 34.

The legs 24 which extend downward from the plate 39 are fitted over the facets on the rings 23 and fastened in place by the bolt 26 which is secured by a nut 73. The gimbal type spring mounting or pivotal connection is held in a vertically disposed position by bolting the eyes of the links 29 and 30 between clevis like ears 40 on the side of the side plates 37 with bolts 41.

Whenever the axles 19 oscillate, or revolve, about the pin 20, the horizontal distance between the springs will be decreased; therefore, I had to use a shackle which would shift sideways with the springs. I also wanted to eliminate brackets below the frame in front of and behind the wheels; so, I designed the traveling shackles 42. The traveling shackles 42 have a pair of shackle lengths 43 acting as struts below the carriage 44 as shown in Fig. 3. The carriage 44 has rollers 45 which run on the edges of the flanges 46 of the cross member 47 as a track so that the carriage 44 on both sides of the vehicle frame 6 can roll toward the center of the vehicle whenever the axles 19 rotate about the pin 20. The rollers 45 are always parallel to the vehicle frame 6; therefore when the shackle lengths 43 are fastened with a transverse pin 48 as shown on the left side of Fig. 5, the shackles will prevent the spring from twisting.

I made the traveling shackle 42 by cutting a pair of plates 49 to fit around the side frames 7 as shown on the right side of Fig. 3. I then welded the pair of plates 49 to a spacer block 50 so that the plates 49 form side frames for the carriage 44 and the spacer block 50 acts as a cross member.

The width of the spacer block 50 is the same width as the spring pack 34 so that the shackle lengths 43 will fit flush with the sides of the spacer block 50 and the sides of the spring pack 34. The length of the spacer block 50 is the same as the length of the rollers 45 so that the pair of plates 49 will be spaced the correct distance for the rollers 45. The spacer block 50 is flat on the bottom and welded flush with the bottoms of the pair of plates 49, and the spacer block 50 is high enough for the shackle lengths 43 to extend up between the flanges 46 of the cross member 47 if necessary. The top side of spacer block 50 must be notched out enough at the ends to clear the flanges 46 when the rollers 45 are rolling, or resting on the flanges 46.

A hole is drilled through the side of spacer block 50 for inserting the transverse pin 48; holes are drilled and reamed in the bottom corners of the pair of plates 49 for pressing in shaft bolts 51; and holes are drilled in the ears at the top of the pair of plates 49 for bolting in a safety block 52. The welded assembly around which the carriage 44 is built is now completed.

Rollers 45 can be made by taking a large round bar or rod, cutting off pieces the length desired for the rollers 45, and machining off the ends to form a conical rolling surface and leaving a nearly vertical shoulder to form a flange. A hole is then drilled and reamed through the center of the roller 45 and it is ready for assembly.

The safety block 52 is only a rectangular block with holes tapped in the sides to match the holes in the pair of plates 49.

The carriage 44 is assembled by pushing the pin 48 through the hole in the spacer block 50 and the two shackle lengths 43 are pressed over the ends of the pin 48 and heads are formed on the ends of the pin 48, something like rivet heads, to hold the shackle lengths 43 in place. The rollers 45 are then bolted between the pair of side plates 49 with the shaft bolts 51. The carriage 44 thus assembled, is pushed up under the side frames 7 with the rollers 45 chock against the flanges 46 and the safety block 52 is bolted in place. The carriage 46 is then left to swing by the safety block 52 until the spring pack 34 is shackled to the shackle lengths 43. The safety block 52 is added to keep the rollers 45 from bouncing out from between the flanges 46 when the vehicle is traveling over rough roads. I machined the ends of the rollers 45 conical so that they would act like self aligning wheels and keep the shoulders from rubbing against the inside faces of the flanges 46.

The simplest method that I could find for shackling the ends of the springs 34 to an equalizer between the tandem axles 19 is to fasten a bracket 53 beneath each of the side members 7 with a roller 54 bolted to the bottom of the bracket with a large bolt 55 which acts as a shaft for the roller 54. A flexible tension member 56 passes around and beneath the roller 54 and the ends of the flexible tension member 56 are shackled to the ends of the springs 34 so that the rollers 54 swing on the flexible tension member 56 which is supported by the ends of the springs 34. The type of flexible tension member 56 which I prefer to use is listed in the trade catalogues as "cable chain" and is manufactured in the form substantially as shown on Fig. 5. The reason for using a cable chain for the flexible tension member 56 is that a cable chain has complete flexibility in the direction around the roller 54, but is stiff enough in a lateral direction so that it will not throw sideways and kink up when traveling over rough roads which cause the springs to jump up and down, while at the same time the cable chain has enough flexibility in a lateral direction that it will give when the spring moves sideways, and the resultant lateral force on the leaf spring will be a negligible quantity. The cable chain 56 also presents a wide smooth bearing surface to the smooth cylindrical surface of the roller 54 so that the force of the load will cause the cable chain 56 to tend to adjust itself laterally on the smooth cylindrical surface of the roller 54 so that the resultant lateral force on the springs 34 will tend to become zero. This is important for the mechanism which I am using because the axles 19 oscillating about the pin 20 impart a lateral motion to the springs 34. I have made the rollers 54 much wider than the cable chain 56, as shown on Fig. 6, so that the cable chain can move with a lateral motion which corresponds to the lateral motion of the leaf springs 34.

As shown in Fig. 1, I have made a simple, but effective bracket 53 beneath each of the side members 7 by framing two cross members 57 between the side members 7, with the backs of the cross members 57 flush with and fastened to the edges of the vertical members 58. I made the vertical members 58 out of structural channels with cover plates 59 welded over the edges and extending down almost to the roller 54, and welded to the cross member 57 at the top. This construction forms a hollow box girder from the frame 6 down to the top side of the roller 54 and gives the maximum strength with the minimum weight. At the lower ends of the channels 58, I have welded filler blocks 60 to strengthen the channels 58 below the box girder construction and also for giving a large bearing area for the bolt 55.

The side members 7 had to be moved toward the center of the vehicle enough to clear the wheels when they are at their maximum angle of tilt as shown on Fig. 4. The spring pack 34 is located as close as possible to the wheels 27 for stability of the vehicle, and the outside edge of the roller 54 is located slightly beyond the outside edge of the spring pack 34 by welding a spacer block 75 outside of each side member 7. When the vertical member 58 outside of each side member 7 is welded to the outside of the spacer block 75, the bracket 53 will be located laterally and the roller 54 is properly located under the spring packs 34.

As shown in Fig. 5, the tandem axles 19 are spaced at intervals along the length of the vehicle by means of radius rod assemblies 61 connecting the gimbal type spring mountings 25 to the bottom of the brackets 53. The side plates 37 extend down the edges of the legs 24 forming ears 62 which are strengthened by a cover 63 welded in between. A gimbal block 64 is bolted between the ears 62 by a bolt 65 so that the gimbal block 64 can revolve on the bolt. A pair of special clevises 66 and 67 are secured by the bolt 55 so that they can revolve about the bolt 55.

The clevises 66 and 67 are made by welding the edges of two flat bars 68 to the sides of two flat bars 69, as shown in Fig. 6 and Fig. 5, and drilling holes for the horizontal bolt 55 in the bars 68 and drilling holes for the vertical bolts 71 in the bars 69. A link 70 is fastened to the clevises 66 and 67 between the flat bars 69 by means of a bolt 71 and the other end of the link 70 is fastened to the gimbal block 64 by means of a bolt 72 so that the link 70 is free to swing in a horizontally disposed plane about both of the bolts 71 and 72.

The bars 68 for the clevis 66 are spaced to fit over the roller 54 and the bars 68 for the clevis 67 are spaced to fit over the clevis 66 and the whole assembly is secured to the bottom of the channel 58 by a single large bolt 55 so that the roller 54, the clevis 66, or the clevis 67 can either one revolve about the bolt 55 independently.

If the right front wheel of the vehicle shown in Fig. 1 should roll over a bump and be elevated as shown in Fig. 4 and at the same time, if the left rear wheel should roll over a bump and be elevated the same amount as the right front wheel, the deck or floor of the vehicle would remain level as shown in Fig. 4 and a view of the front axle would appear the same as Fig. 4 and a view of the rear axle would have the axle, when looking from the same direction, tilted in the opposite direction from Fig. 4. This is the worst possible position for tandem axles in equalized suspension, so I will describe what happens to the mechanism in this invention whenever the wheels move from level ground, or level tracks, to this condition:

As shown in Fig. 5, the pin 32 is held at a fixed distance above the short heavy pin 20 and the pins 32 and 20 are both held in a plane perpendicular to the floor of the vehicle by the double-barrel guide sleeve 18 which slides up and down over the vertical legs 15 of the T-guide structure 10. The short heavy pin 20 is spaced at a fixed distance from the bolts 26 by the holes in the axles 19. The bolts 41 are spaced at a fixed distance from the pin 32 by the connecting links 29 and 30. I have located a reference point 74 in the vertical center of the spring pack 34 directly above the bolt 26 and at the same height as the bolt 41 on the side of the gimbal type spring mounting 25. As described above, when the axles 19 are horizontal as shown on Fig. 2, the distance between the pins 32 and the bolts 41 plus the distance from the bolts 41 to the point 74 is equal to the distance from the pin 20 to the bolts 26; and the distance from the pin 20 to the pin 32 is the same as the distance from bolt 26 to the point 74; therefore, we have a rectangle because the axle 19 is perpendicular to the double-barrel guide sleeve 18. Now, as the axle 19 starts to tilt, the rectangle tends to become a parallelogram because the lines through the pivot points are no longer perpendicular to each other. As the axles 19 tilt to the position shown in Fig. 4, the distance from the pin 20 to the pin 32 remains equal to the distance from the bolt 26 to the point 74; but, the distance from the pin 32 to the point 74 is slightly less than the distance from the pin 20 to the bolt 26. A line through the bolt 41 and point 74 is always perpendicular to a line through the bolt 26 and point 74; therefore, the distance from the pins 32 to the point 74 is decreased in proportion to the angle of oscillation, or amount of tilt by the axle 19. This has the effect of causing the spring 34 and spring mounting 25 to lean slightly toward the center of the vehicle when the axles oscillate, or tilt. Although the purpose of this invention is to prevent the master leaf of the spring from twisting, I cannot eliminate this small amount of twist because I cannot find a physical means of placing the bolt 41 at the point 74; however, I can reduce this twist to a minute quantity by placing the bolt 41 as close to the point 74 as possible.

As I am now describing the vehicle with the front and rear axles oscillating the same amount in opposite directions, the horizontal distance between the bolt 26 and the centerline of the vehicle will decrease at the same rate of speed for both axles and the flexible tension member 56 will roll around the roller 54 at the same time it is moving toward the center of the vehicle and the rollers 45 of the traveling shackle 42 will roll toward the center of the vehicle on the track provided by the flanges 46 of the cross member 47. The links 70 of the radius rod assembly 61 will pivot on the vertical bolts 71 and 72 because the horizontal distance from the center line of the vehicle is decreased for spring mounting 25, and the radius rod assembly 61 will pivot about the horizontal bolts 55 and 65 because the elevation of the spring mountings 25 is changed with relation to the elevation of the rollers 54 thereby making use of the universal, or gimbal type connections at the ends of the radius rod assemblies 61. As the radius rod assemblies 61 swing at an angle, the longitudinal spacing of the axles 19 from the brackets 53 will be decreased which will cause the cross arms 11 of the T-guide structures 10 to rotate in the bearings 12 by a very small angle and the eyes of the springs 34 will swing toward the brackets 53 on the shackles provided at both ends of the spring 34. From this description it can be seen that either axle can tilt, or oscillate, to any angle within defined limits and the springs 34 will stand up straight without side thrust, end thrust, or twist to cause the master leaf of the spring to be overloaded.

When both of the wheels 27 on one of the axles 19 change elevation at the same time, such as crossing a valley gutter at right angles, the vertical legs 15 slide up or down in the hollow cylinders 17 and the vehicle stays in equalized suspension by the flexible tension members 56 rolling around the rollers 54.

Whenever the wheels revolve about the spindles on the ends of the axles 19, the friction in the bearings tends to rotate the axles and whenever the brakes are applied, this rotating force, or torque, is increased to serious proportions. In the mechanism which I have described here, the brake torque is transmitted to the frame 6 without affecting the springs. The short heavy pin 20 is journaled in the slots of the double-barrel guide sleeve 18 and the brake torque thusly transmitted to the double-barrel guide sleeve 18 is resisted by the vertical legs 15 of the T-guide structure 10 passing through the hollow cylinders 17. As the brake torque in each axle 19 is separately resisted by a pair of T-guide structures 10 above each axle 19, the major portion of the forces which cause the rear axle to try to rotate around the front axle is absorbed through the T-guide structures 10 and no stresses whatsoever are imparted to the springs 34 because of brake torque; therefore, the objectional effects of brake torque are eliminated.

While I have shown and described a particular embodiment of my invention I do not wish to limit myself to the exact form shown, since the particular construction shown and described is intended as illustrative rather than delimitative of the invention. The principle underlying my invention can be applied to other forms of equalizing mechanism for vehicles known to the art and not hereinabove specifically referred to, illustrated or described. While I have described a vehicle with two tandem axles it is to be understood that a vehicle with three axles or four axles in tandem; or, with any number of axles in tandem can readily be constructed using the same underlying principles. Furthermore, the addition of a steering mechanism or changing the size of various parts for use with a self-propelled vehicle does not change the scope of this invention.

I claim:

1. In combination with a vehicle frame, longitudinally spaced tandem axles underneath said frame, ground wheels rotatably mounted on said axles, spaced pairs of leaf springs extending transversely of each axle, means pivotally connecting each spring centrally to an end portion of an axle, means connecting each axle medially to the frame so that the axles and springs may be vertically displaced relatively to the frame, and links extending laterally in opposite directions from said last mentioned means and pivotally connected at their outer ends to adjacent springs for maintaining the springs in a vertically disposed position when a ground wheel passes over an uneven surface.

2. In a vehicle, the combination of tandem axles longitudinally spaced under the vehicle, means for permitting said axles to move up and downward and to oscillate, ground wheels rotatably mounted on said axles, leaf springs mounted on each axle in spaced relation to the center thereof, a gimbal type mounting for supporting said springs on the axle, link arms parallel to the axles, means for fastening said arms to the sides of said mounting, means centrally connecting said link arms, and means for maintaining said connection a fixed distance vertically above the center of the axle, whereby the center of the axles and said connection are at all times located centrally under the vehicle.

3. In combination with a vehicle frame, longitudinally spaced tandem axles underneath said frame, ground wheels rotatably mounted on said axles, spaced pairs of leaf springs extending transversely of each axle, means pivotally connecting each spring centrally to an end portion of an axle, means connecting each axle medially to the frame to permit the axles and springs to be displaced vertically relatively to the frame, a pair of link arms parallel at all times to said axles, means for rotatably fastening one end of each link centrally under the vehicle at a fixed distance above the axle fastening, and means for fastening the other end of each to the sides of said pairs of leaf springs whereby the top of the leaf springs will be spaced at all times in a vertically disposed position above the connection of the leaf springs to the axles.

4. In combination with a vehicle frame, longitudinally spaced tandem axles underneath said frame, ground wheels rotatably mounted on said axles, spaced pairs of leaf springs extending transversely of each axle, means pivotally connecting each spring centrally to an end portion of an axle, a pair of T-shaped guide members attached to said frame on opposite sides of each axle, a housing associated with said axle, sleeves formed in opposite sides of said housing, downwardly extending arms on said guide members, said housing being slidably mounted on said downward arms, a pair of link arms parallel to said axle, means connecting said arms to said housing, and means connecting said arms to the sides of said leaf springs whereby the springs will be maintained in a vertically disposed position when the axle tilts or oscillates.

References Cited in the file of this patent

UNITED STATES PATENTS

| | | |
|---|---|---|
| 2,272,572 | Merry | Feb. 10, 1942 |
| 2,624,593 | Stover | Jan. 6, 1953 |